US008698928B2

(12) United States Patent
Mishina et al.

(10) Patent No.: US 8,698,928 B2
(45) Date of Patent: Apr. 15, 2014

(54) REDUCED SIZE IMAGE PICKUP APPARATUS RETAINING IMAGE QUALITY

(75) Inventors: Koji Mishina, Kanagawa (JP); Yoshikazu Nitta, Tokyo (JP)

(73) Assignee: Sony Corporation (JP)

( * ) Notice: Subject to any disclaimer, the term of this patent is extended or adjusted under 35 U.S.C. 154(b) by 622 days.

(21) Appl. No.: 12/194,176

(22) Filed: Aug. 19, 2008

(65) Prior Publication Data

US 2009/0051801 A1 Feb. 26, 2009

(30) Foreign Application Priority Data

Aug. 21, 2007 (JP) .................................. 2007-214484

(51) Int. Cl.
*H04N 5/335* (2011.01)
*H04N 3/14* (2006.01)

(52) U.S. Cl.
USPC .......................................... 348/308; 348/302

(58) Field of Classification Search
USPC .......................................... 348/301, 302, 308
See application file for complete search history.

(56) References Cited

U.S. PATENT DOCUMENTS

| 6,956,605 | B1 * | 10/2005 | Hashimoto | 348/301 |
| 7,238,926 | B2 * | 7/2007 | Guidash et al. | 250/208.1 |
| 7,800,146 | B2 * | 9/2010 | McKee et al. | 257/292 |
| 7,924,333 | B2 * | 4/2011 | Yin et al. | 348/308 |
| 2005/0110885 | A1 * | 5/2005 | Altice et al. | 348/308 |
| 2005/0195645 | A1 * | 9/2005 | Panicacci et al. | 365/156 |
| 2006/0038904 | A1 * | 2/2006 | Kudoh | 348/308 |
| 2006/0043440 | A1 * | 3/2006 | Hiyama et al. | 257/291 |
| 2006/0219866 | A1 * | 10/2006 | Egawa et al. | 250/208.1 |
| 2006/0220939 | A1 * | 10/2006 | Kirsch | 341/155 |
| 2007/0019091 | A1 * | 1/2007 | Muramatsu et al. | 348/308 |
| 2007/0040922 | A1 * | 2/2007 | McKee et al. | 348/308 |

FOREIGN PATENT DOCUMENTS

| JP | 2000-078474 | 3/2000 |
| JP | 2000-152086 | 5/2000 |
| JP | 2000-261815 | 9/2000 |
| JP | 2002-027331 | 1/2002 |
| JP | 2006-049361 | 2/2006 |
| JP | 2006-080861 | 3/2006 |
| JP | 2006-080937 | 3/2006 |
| JP | 2006-340044 | 12/2006 |
| JP | 2007-166135 | 6/2007 |
| WO | 2006/129762 | 12/2006 |

OTHER PUBLICATIONS

Japanese Office Action issued on Jul. 24, 2012, in connection with counterpart JP Application No. 2007-214484.
Japanese Office Action issued on Feb. 7, 2012, in connection with counterpart JP Application No. 2007-214484.

* cited by examiner

*Primary Examiner* — Nelson D. Hernández Hernández
(74) *Attorney, Agent, or Firm* — Sheridan Ross P.C.

(57) ABSTRACT

An image pickup apparatus for photographing an image, includes: a photoelectric converter to convert incident light an electric charge and accumulate the electric charge, a transfer element to transfer the electric charge accumulated in the photoelectric converter, a converter to convert the electric charge in the photoelectric converter transferred via the transfer element into a voltage, a reset element to reset potentials of the converter, and an amplifier to amplify a voltage converted by the converter to generate a pixel signal and output the pixel signal to a read signal line for reading the pixel signal. A plurality of the photoelectric converter and the transfer element are disposed at least in a horizontal direction share the amplifier and the read signal line.

16 Claims, 11 Drawing Sheets

FIG. 5
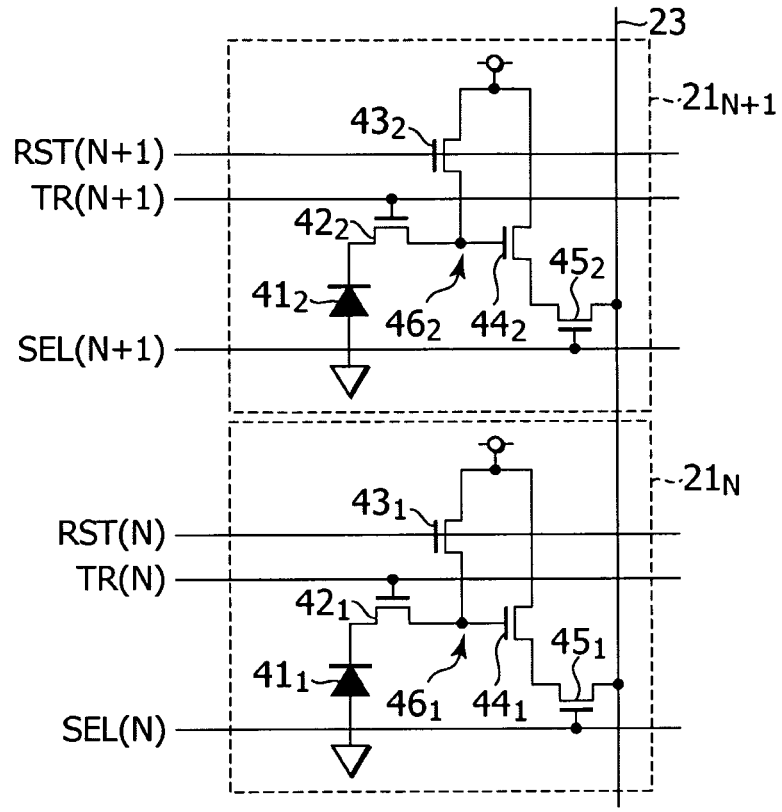
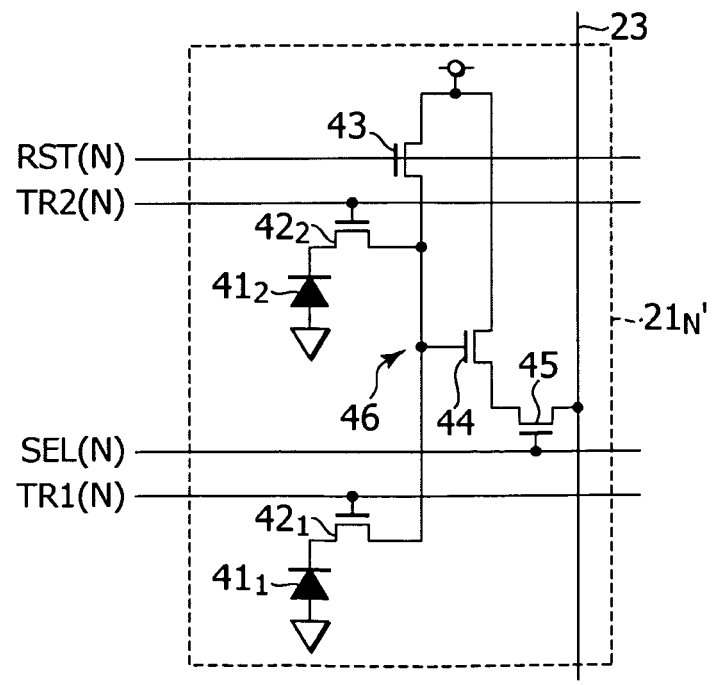

REDUCED SIZE IMAGE PICKUP APPARATUS RETAINING IMAGE QUALITY

CROSS-REFERENCE TO RELATED APPLICATIONS

The present application claims benefit of priority of Japanese patent Application No. 2007-214484 filed in the Japanese Patent Office on Aug. 21, 2007, the entire disclosure of which is incorporated herein by reference.

BACKGROUND OF THE INVENTION

1. Field of the Invention

The present invention relates to an image pickup apparatus.

2. Description of Related Art

A charge coupled device (CCD), a complementary metal oxide semiconductor (CMOS) sensor and the like have been used as an image pickup device, and using a plurality of pixels and making compact an image pickup device is under progress.

The increase in the number of pixels and the miniaturization of image pickup device make a unit cell size of pixels small, increase a ratio of a transistor area to a pixel area, and make the area of photodiodes small. As a result, the saturated charge amount and the sensitivity of each pixel may be lowered and an image quality may be degraded.

Japanese Unexamined Patent Application Publication No. 2006-340044 discloses a CMOS sensor (hereinafter called a CMOS sensor mounting column parallel analog to digital converters (ADCs) where applicable) having an ADC disposed every columns of pixels formed in a matrix shape, the ADCs being disposed in parallel.

FIG. 1 is a block diagram showing an example of the structure of a CMOS sensor mounting column parallel ADCs.

In FIG. 1, a CMOS sensor 11 includes a timing control circuit 12, a row scanner 13, a pixel array 14, m load MOSs $15_1$ to $15_m$, a DAC (Digital Analog Converter) 16, a column processing unit 17, a column scanner 18, and a horizontal output line 19.

On the basis of a master clock having a predetermined frequency, the timing control circuit 12 supplies the row scanner 13, DAC 16, column processing unit 17, and column scanner 18, with a clock signal, a timing signal and the like necessary for the operations of these components.

The row scanner 13 sequentially supplies a signal for controlling the output of a pixel signal, to pixels disposed in a vertical direction of the pixel array 14, at a predetermined timing.

The pixel array 14 has pixels $21_{1,1}$ to $21_{m,n}$ having m columns and n rows: n horizontal signal lines $22_1$ to $22_n$ and m vertical signal lines $23_1$ to $23_m$.

Each of the pixels $21_{1,1}$ to $21_{m,n}$ includes a photodiode (not shown). A pixel signal corresponding to an electric charge accumulated in each photodiode is outputted to each of the vertical signal lines $23_1$ to $23_m$ in response to a signal supplied from the row scanner 13 via each of the horizontal signal lines $22_1$ to $22_n$.

The horizontal lines $22_1$ to $22_n$ connect the row scanner 13 to the pixels $21_{1,1}$ to $21_{m,n}$ in a horizontal direction. Namely, the pixels $21_{1,1}$ to $21_{m,1}$ are connected to the horizontal signal line $22_1$, the pixels $21_{1,2}$ to $21_{m,2}$ are connected to the horizontal signal line $22_2$, and in a similar manner to follow, the pixels $21_{1,n}$ to $21_{m,n}$ are connected to the horizontal signal line $22_n$.

The vertical signal lines $23_1$ to $23_m$ connect the column processing unit 17 to the pixels $21_{1,1}$ to $21_{m,n}$ in a vertical direction. Namely, the pixels $21_{1,1}$ to $21_{1,n}$ are connected to the vertical signal line $23_1$, the pixels $21_{2,1}$ to $21_{2,n}$ are connected to the vertical signal line $23_2$, and in a similar manner to follow, the pixels $21_{m,1}$ to $21_{m,n}$ are connected to the vertical signal line $23_m$.

Drains of the load MOSs $15_1$ to $15_m$ are connected to the vertical signal lines $23_1$ to $23_m$. A bias voltage is applied to the gates, and the sources are grounded. The load MOS and an amplifying transistor (not shown) in each of the pixels $21_{1,1}$ to $21_{m,n}$ constitute a source follower circuit.

In accordance with a timing signal or the like from the timing control circuit 12, DAC 16 generates a ramp signal (having a waveform shown in FIG. 2 to be described later) and supplies the ramp signal to the column processing unit 17.

The column processing unit 17 includes ADCs $24_1$ to $24_m$ disposed in parallel, wherein the number of ADCs is m.

The ADCs $24_1$ to $24_m$ are connected to the vertical signal lines $23_1$ to $23_m$, respectively, and perform A/D conversion of pixel signals supplied via the vertical signal lines $23_1$ to $23_m$ by using a ramp signal supplied from DAC 16.

The ADCs $24_1$ to $24_m$ each includes a comparator, a counter, a switch, and a memory. Namely, ADC $24_1$ includes a comparator $25_1$, a counter (CNT) $26_1$, a switch $27_1$, and a memory $28_1$. The ADC $24_2$ includes a comparator $25_2$, a counter $26_2$, a switch $27_2$, and a memory $28_2$, and in a similar manner to follow, ADC $24_m$ includes a comparator $25_m$, a counter $26_m$, a switch $27_m$, and a memory $28_m$.

Pixel signals are supplied from the pixels $21_{m,1}$ to $21_{m,n}$ to the comparators $25_1$ to $25_m$, respectively, via the vertical signal lines $23_1$ to $23_m$. The ramp signals from DAC 16 are supplied to the comparators $25_1$ to $25_m$, respectively.

The comparators $25_1$ to $25_m$ compare the ramp signal supplied from DAC 16 with the pixel signals supplied via the vertical signal lines $23_1$ to $23_m$, and supply comparison signals representative of the comparison results to the counters $16_1$ to $26_m$. Namely, the comparator $25_1$ supplies a comparison signal between the ramp signal from DAC 16 and the pixel signal supplied from the pixels $21_{1,1}$ to $21_{1,n}$ via the vertical signal line $23_1$, to the counter $26_1$. The comparator $25_2$ supplies a comparison signal between the ramp signal from DAC 16 and the pixel signal supplied from the pixels $21_{2,1}$ to $21_{2,n}$ via the vertical signal line $23_2$, to the counter $26_2$, and in a similar manner to follow, the comparator $25_m$ supplies a comparison signal between the ramp signal from DAC 16 and the pixel signal supplied from the pixels $21_{m,1}$ to $21_{m,n}$ via the vertical signal line $23_m$, to the counter $26_m$.

The counters $26_1$ to $26_m$ are supplied with a clock signal from the timing control circuit 12, and count the clock signals on the basis of the comparison signal from the comparators $25_1$ to $25_m$. The count values representative of the count results of clock signals by the counters $26_1$ to $26_m$ are supplied to the memories $28_1$ to $28_m$ via the switches $27_1$ to $27_m$, as pixel data obtained by A/D conversion of the pixel signal.

In response to the timing signal from the timing control circuit 12, the switches $27_1$ to $27_m$ connect the counters $26_1$ to $26_m$ and the memories $28_1$ and $28_m$.

The memories $28_1$ to $28_m$ temporarily store the pixel data supplied from the counters $26_1$ to $26_m$, and output the pixel data to the horizontal output line 19 under control of the column scanner 18.

The column scanner 18 sequentially outputs the pixel data stored in the memories $28_1$ to $28_m$ to the horizontal output line 19 at a predetermined timing.

The horizontal output line 19 is connected to an image processing circuit or the like at the succeeding stage, and supplies the pixel data outputted from the memories $28_1$ to $28_m$ to an image processing circuit and the like.

FIG. 2 is a timing chart illustrating the operation of the CMOS sensor 11 shown in FIG. 1.

For example, as shown in the uppermost field of FIG. 2, during a 1H period (one horizontal scan period), a pixel signal is read from a pixel $21_N$ at the N-th row, and A/D converted by the column processing unit 17. During the next 1H period, while a pixel signal is read from a pixel $21_{N+1}$ at the (N+1)-th row, pixel data obtained by A/D conversion of the pixel signal at the N-th row is outputted as shown in the second uppermost field of FIG. 2.

The pixel signal read from the pixel 21 has a waveform shown in the third field of FIG. 2, and the ramp signal outputted from DAC 16 has a waveform shown in the fourth (lowermost) field of FIG. 2. The comparator 25 in FIG. 1 compares the ramp signal with the pixel signal having these waveforms.

As described above, in the CMOS sensor 11, ADCs $24_1$ to $24_m$ are disposed at a pitch similar to that of the pixels $21_{1,1}$ to $21_{m,n}$ in the horizontal direction. As a result, the ADCs $24_1$ to $24_m$ perform A/D conversion of the pixel signals in parallel. As described above, as the CMOS sensor 11 mounting column parallel ADCs is made compact in recent years, the pixel array 14 is becoming small. Accordingly, a pitch of the pixels $21_{1,1}$ to $21_{m,n}$ in the horizontal direction becomes narrow, so that it is difficult to dispose ADCs $24_1$ to $24_m$ at the same pitch as that of the pixels.

Consequently, for example, the column processing unit 17 is disposed in two areas. As a result, the ADCs $24_1$ to $24_m$ can be disposed at a pitch wider than that of the pixels $21_{1,1}$ to $21_{m,n}$ in the horizontal direction.

FIG. 3 is a block diagram showing an example of the structure of a CMOS sensor 11' having two column processing units 17A and 17B.

In FIG. 3, the CMOS sensor 11' includes a timing control circuit 12, a row scanner 13, a pixel array 14, m load MOSs $15_1$ to $15_m$, two DACs 16A and 16B, two column processing units 17A and 17B, two column scanners 18A and 18B, and two horizontal output lines 19A and 19B.

As shown in FIG. 3, in the CMOS sensor 11' mounting column parallel ADCs, the column processing units 17A and 17B are disposed to sandwich the pixel array 14 in the vertical direction (up/down).

Although the column processing unit 17 shown in FIG. 1 includes m ADCs $24_1$ to $24_m$, the column processing units 17A and 17B have each m/2 ADCs (not shown). Namely, the column processing unit 17A is provided with ADCs for A/D conversion of pixel signals at even columns among pixel signals read from the pixels $21_{1,1}$ to $21_{m,n}$. The column processing unit 17B is provided with ADCs for A/D conversion of pixel signals at odd columns among pixel signals read from the pixels $21_{1,1}$ to $21_{m,n}$.

In the column processing units 17A and 17B, ADCs may therefore be disposed at a pitch twice that of the pixels $21_{1,1}$ to $21_{m,n}$ in the horizontal direction.

The two column processing units 17A and 17B may be disposed sandwiching the pixel array 14 in the horizontal direction, or may be disposed on the same side of the pixel array 14 at two stages.

The two column processing units 17A and 17B of the CMOS sensor 11' may have different characteristics. In this case, a photographed image may show vertical stripes, which degrades the image quality.

For example, Japanese Unexamined Patent Application Publication No. 2006-80861 discloses a CMOS sensor in which one ADC A/D converts pixels of a plurality of columns so that ADCs can be disposed at a broader pitch than that of pixels in the horizontal direction.

FIG. 4 is a block diagram showing an example of the structure of a CMOS sensor 11" in which one ADC A/D converts pixel signals of two columns.

In FIG. 4, the CMOS sensor 11" includes a timing control circuit 12, a row scanner 13, a pixel array 14, a column processing unit 17', a column scanner 18, and a horizontal output line 19.

The structure of the column processing unit 17' of the CMOS sensor 11" shown in FIG. 4 is different from that of the column processing unit 17 of the CMOS sensor 11 shown in FIG. 1.

Namely, the column processing unit 17' includes capacitors the number of which is m, $31_1$ to $31_m$, switches the number of which is m, $32_1$ to $32_m$, ADCs the number of which is m/2, $33_1$ to $33_{m/2}$, switches the number of which is m, $34_1$ to $34_m$, and memories the number of which is m, $35_1$ to $35_m$.

The capacitors $31_1$ to $31_m$ are connected to the vertical signal lines $23_1$ to $23_m$, respectively, and hold pixel signals supplied via the vertical signal lines $23_1$ to $23_m$.

The switches $32_1$ to $32_m$ switch the connection between the capacitors 311 to 31m and ADCs $33_1$ and $33_{m/2}$. For example, the switch $32_1$ switches the connection between the capacitor $31_1$ and ADC $33_1$ and the connection between the capacitor $31_2$ and ADC $33_1$. When the capacitor 311 is coupled to ADC $33_1$, the pixel signal held in the capacitor $31_1$ is supplied to ADC $33_1$. When the capacitor $31_2$ is coupled to ADC $33_1$, the pixel signal held in the capacitor $31_2$ is supplied to ADC $33_1$.

The ADCs $33_1$ to $33_{m/2}$ A/D convert the pixel signals supplied from the capacitors $31_1$ to $31_m$. Namely, ADC $33_1$ A/D converts the pixel signal supplied from the capacitors $31_1$ and $31_2$. The ADC $33_2$ performs A/D conversion of the pixel signal supplied from the capacitors $31_3$ and $31_4$, and in a similar manner to follow, ADC $33_{m/2}$ performs A/D conversion of the pixel signal supplied from the capacitors $31_{m-1}$ and $31_m$.

The switches $34_1$ to $34_m$ switch the connection between ADC $33_1$ to $33_{m/2}$ and the memories $35_1$ to $35_m$. For example, at the timing when ADC $33_1$ A/D converts the pixel signal supplied via the vertical signal line $23_1$, the switch $34_1$ connects ADC 331 and memory $35_1$. At the timing when ADC $33_1$ performs A/D conversion of the pixel signal supplied via the vertical signal line $23_2$, the switch $34_2$ connects ADC $33_2$ and memory $35_2$.

The memories $35_1$ to $35_m$ temporarily store pixel data output from ADCs $33_1$ to $33_{m/2}$, and output the pixel data to the horizontal output line 19 under control of the column scanner 18.

In the CMOS sensor 11" constructed as above, ADCs $33_1$ to $33_{m/2}$ can be disposed at a pitch twice that of the pixels $21_{1,1}$ to $21_{m,n}$ in the horizontal direction.

In the CMOS sensor 11", the capacitors $31_1$ to $31_m$ hold analog pixel signals read from the pixels $21_{1,1}$ to $21_{m,n}$. There may be a variation in leakage of pixel signals in the capacitors $31_1$ to $31_m$, if there is a variation in capacitances of the capacitors $31_1$ to $31_m$ or a difference of the time from when the pixel signal is held to when the pixel signal is supplied to the ADCs $33_1$ to $33_{m/2}$. The quality of an image photographed with the CMOS sensor 11" may therefore be degraded.

As described above, as the unit cell size of a pixel becomes small, the area of a photodiode becomes small, and the image quality is degraded if the saturated electric charge amount and a sensitivity of a pixel are reduced.

As a method of avoiding the reduction in the saturated electric charge amount and sensitivity, there is a method of sharing a floating diffusion by using pixels in the vertical direction.

With reference to FIG. 5, description will be made on sharing a floating diffusion.

The upper area of FIG. 5 shows pixels $21_N$ and $21_{N+1}$ having a structure that a floating diffusion is not shared. The lower area of FIG. 5 shows a pixel $21_N'$ having a structure that a floating diffusion is shared.

As shown in FIG. 5, the pixel $21_N$ includes a photodiode $41_1$, a transfer transistor $42_1$, a reset transistor $43_1$, an amplifying transistor $44_1$, a select transistor $45_1$, and a floating diffusion $46_1$.

The electric charge corresponding to a light reception amount of the photodiode $41_1$ is transferred to the floating diffusion $46_1$ via the transfer transistor $42_1$, and accumulated therein. The floating diffusion $46_1$ is clamped to a predetermined reference potential by the reset transistor $43_1$, and the electric charge accumulated in the reset transistor $43_1$ is amplified by the amplifying transistor $44_1$ and outputted to the vertical signal line 23 via the select transistor $45_1$.

Similar to the pixel $21_N$, the pixel $21_{N+1}$ includes a photodiode $41_2$, a transfer transistor $42_2$, a reset transistor $43_2$, an amplifying transistor $44_2$, a select transistor $45_2$, and a floating diffusion $46_2$.

The pixel $21_N'$ includes photodiodes 411 and 412, transfer transistors 421 and 422, a reset transistor 43, an amplifying transistor 44, a select transistor 45, and a floating diffusion 46. In the pixel $21_N'$, the electric charge corresponding to the light reception amount of the photodiode 411 and the electric charge corresponding to the light reception amount of the photodiode 412 are alternately accumulated in the floating diffusion 46.

Thus, the pixel $21_N'$ shares the floating diffusion 46 so that it is possible to avoid the reduction in the saturated charge amount and sensitivity of a pixel.

However, in a CMOS sensor having a pixel array constituted of pixels sharing a floating diffusion, ADCs are disposed at the same pitch as that of pixels.

SUMMARY OF THE INVENTION

As described above, as a CMOS sensor is made compact, it is difficult to dispose ADCs at the same pitch as that of pixels. An image quality lowers because of the reduction in the saturated charge amount and sensitivity of a pixel.

Accordingly, it is desirable to suppress the image quality from being lowered by a compact CMOS sensor.

In accordance with one aspect of the present invention, there is provided an image pickup apparatus which includes a photoelectric converter, a transfer element, a converter, a reset element, and an amplifier. The photoelectric converter converts incident light into an electric signal and accumulates the electric signal. The transfer element transfers the electric charge accumulated in the photoelectric converter. The converter converts the electric charge in the photoelectric converter transferred via the transfer element into a voltage. The reset element resets a potential of the converter. The amplifier amplifies a voltage converted by the converter to generate a pixel signal and outputs the pixel signal to a read signal line for reading the pixel signal. A plurality of the photoelectric converter and the transfer element disposed at least in a horizontal direction share the amplifier and the read signal line.

According to an embodiment of the present invention, it is possible to suppress the image quality from being lowered by a compact CMOS sensor.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 5 is a diagram explaining a shared floating diffusion.

DETAILED DESCRIPTION OF EMBODIMENTS

In the following description of embodiments of the present invention, the correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

According to one embodiment of the present invention, an image pickup apparatus for photographing an image is provided, which includes:

a photoelectric converter (e.g., photodiode 71a, 71b, 71c, 71d in FIG. 7) for converting incident light into an electric signal and accumulating the electric charge;

a transfer element (e.g., a transfer transistor 72a, 72b, 72c, 72d in FIG. 7) for transferring the electric charge accumulated in the photoelectric converter;

a converter (e.g., a floating diffusion 76 in FIG. 7) for converting the electric charges in the photoelectric converter transferred via the transfer element into a voltage;

a reset element (e.g., a reset transistor 74 in FIG. 7) for resetting potentials of the converter; and an amplifier (e.g., an amplifying transistor 74 in FIG. 7) for amplifying the voltage converted by the converter and outputting a pixel signal obtained by amplifying the voltage to a read signal line for reading the pixel signal, wherein a plurality of the photoelectric converter and the transfer element disposed at least in a horizontal direction share the amplifier and the read signal line.

The image pickup apparatus according to an embodiment of the present invention may further include a control line (e.g., horizontal signal lines $62_1$ to $62_n$ in FIG. 6) for transmitting a signal for controlling a transfer of the electric charge by the transfer element, wherein the control line is independent for each of the plurality of the transfer element sharing the amplifier and the read signal line.

The image pickup apparatus according to an embodiment of the present invention may further include a load metal oxide semiconductor (MOS) (e.g., load MOSs $55_1$ to $55_{m/2}$ in FIG. 6) connected to the read signal line, and the load MOS and the amplifier constitute a source follower circuit.

The image pickup apparatus according to an embodiment of the present invention may further include an analog to digital (A/D) converter (e.g., ADCs $64_1$ to $64_{m/2}$ in FIG. 6) for converting the pixel signal read via the read signal line into a digital signal.

Figure 6:
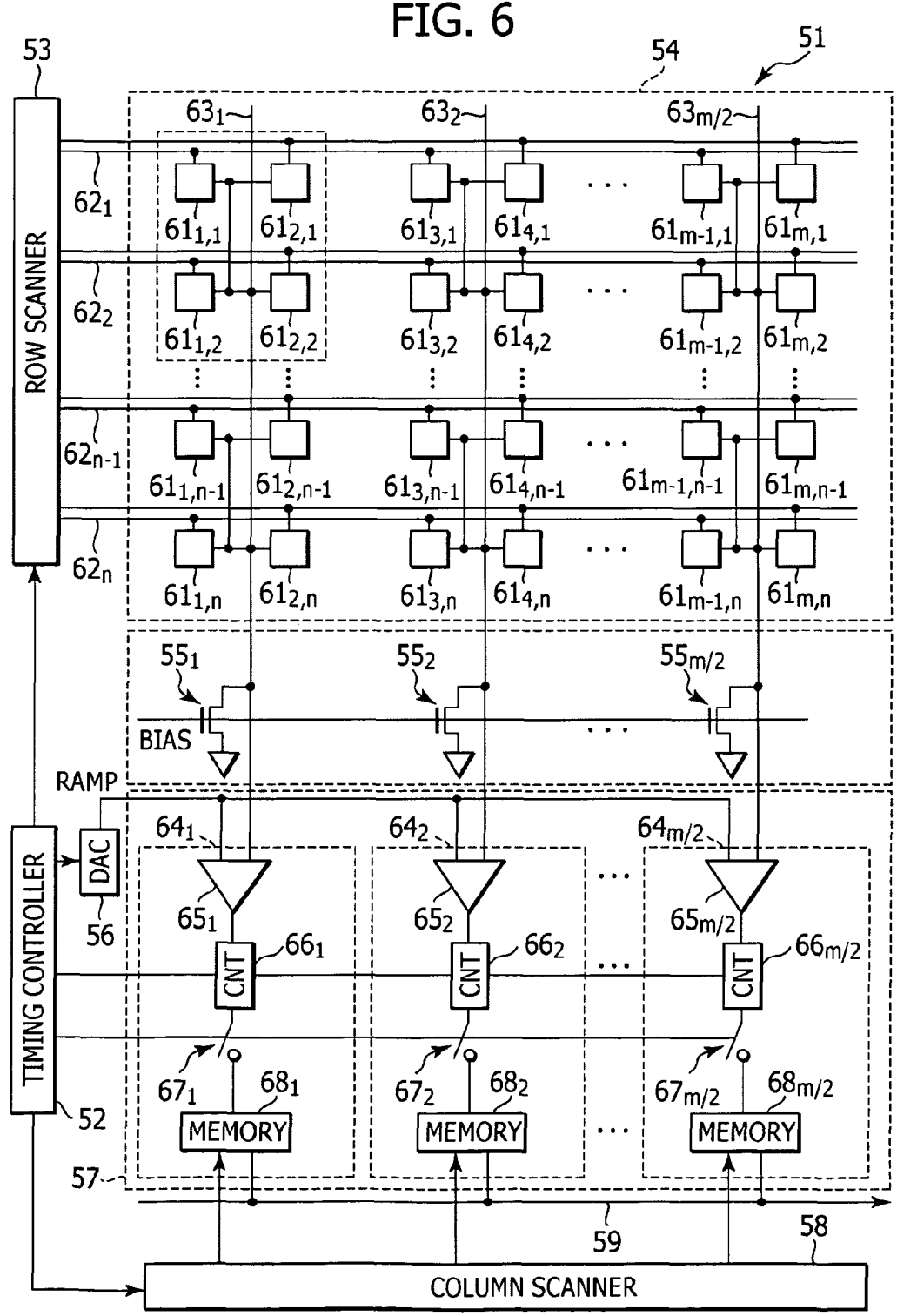
FIG. 6 is a block diagram showing an example of the structure of a CMOS sensor according to an embodiment of the present invention.

In the image pickup apparatus according to an embodiment of the present invention, the A/D converter may further include:

comparison elements e.g., comparators $65_1$ to $65_{m/2}$ in FIG. 6) having a first input terminal for receiving the pixel signal and a second input terminal for receiving a reference voltage lowering from a predetermined reference potential at a constant slope, wherein the comparison element compares the pixel signal inputted to the first input terminal with the reference voltage inputted to the second input terminal, after potentials at the first and second input terminals are reset; and measurement elements (e.g., counters $66_1$ to $66_{m/2}$ in FIG. 6) for measuring a time from when the reference voltage starts lowering from the predetermined reference potential at the constant slope to when the comparison element judges that the reference voltage becomes lower than the pixel signal.

With reference to the accompanying drawings, specific embodiments adopting the present invention will be described in detail.

FIG. 6 is a block diagram showing an example of the structure of a CMOS sensor according to an embodiment employing the present invention.

In FIG. 6, a CMOS sensor 51 includes a timing control circuit 52, a row scanner 53, a pixel array 54, m/2 load MOSs $55_1$ to $55_{m/2}$, a DAC 56, a column processing unit 57, a column scanner 58, and a horizontal output line 59.

On the basis of a master clock having a predetermined frequency, the timing control circuit 52 supplies the row scanner 53, DAC 56, column processing unit 57, and column scanner 58, with a clock signal, a timing signal, and the like necessary for the operations of these components.

The row scanner 53 sequentially supplies a signal for controlling the output of a pixel signal to pixels disposed in a vertical direction of the pixel array 54, at a predetermined timing.

The pixel array 54 includes pixels $61_{1,1}$ to $61_{m,n}$ having m columns and n rows: n horizontal signal lines $62_1$ to $62_n$ and m vertical signal lines $63_1$ to $63_{m/2}$.

Each of the pixels $61_{1,1}$ to $61_{m,n}$ includes a photodiode 71 and a transfer transistor 72, as will be later described with reference to FIG. 7. Four pixels of two horizontal pixels and two vertical pixels share a reset transistor 73, an amplifying transistor 74, a select transistor 75, and a floating diffusion 76.

In this example, a pixel as a constituent element of an image photographed with the CMOS sensor 51 is defined as a pixel 61 having the photodiode 71 for photoelectric conversion and the transfer transistor 72 for transferring electric charges. However, a hardware pixel includes not only the photodiode and transfer transistor, but also the reset transistor, amplifying transistor, select transistor, and floating diffusion. A component constituted of, e.g., four pixels of two horizontal pixels and two vertical pixels, a reset transistor, an amplifying transistor, a select transistor, and a floating diffusion is called hereinafter "2×2 sharing pixel" where applicable.

Namely, for example, the pixels $61_{1,1}$, $61_{2,1}$, $61_{1,2}$ and $61_{2,2}$ surrounded by a broken line in FIG. 6 constitute one 2×2 sharing pixel, the pixels $61_{3,1}$, $61_{4,1}$, $61_{3,2}$ and $61_{4,2}$ constitute one 2×2 sharing pixel, and in a similar manner to follow, the pixels $61_{m-1,n-1}$, $61_{m,n-1}$, $61_{m-1,n}$, and $61_{m,n}$ constitute one 2×2 sharing pixel.

The pixels $61_{1,1}$ to $61_{m,n}$ output pixel signals corresponding to electric charges accumulated in photodiodes 61 of two columns at a time to one vertical signal line 63. Namely, the pixels $61_{1,1}$ to $61_{1,n}$ of the first column and the pixels $61_{2,1}$ to $61_{2,n}$ of the second column output pixel signals to the vertical signal line $63_1$, the pixels $61_{3,1}$ to $61_{3,n}$ of the third column and the pixels $61_{4,1}$ to $61_{4,n}$ of the fourth column output pixel signals to the vertical signal line $63_2$, and in a similar manner to follow, the pixels $61_{m-1,1}$ to $61_{m-1,n}$ of the (m−1)-th column and the pixels $61_{m,1}$ to $61_{m,n}$ of the m-th column output pixel signals to the vertical signal line $63_{m/2}$.

The horizontal lines $62_1$ to $62_n$ connect the row scanner 63 to the pixels $61_{1,1}$ to $61_{m,n}$ in a horizontal direction. Namely, the pixels $61_{1,1}$ to $61_{m,1}$ are connected to the horizontal signal line $62_1$, the pixels $61_{1,2}$ to $61_{m,2}$ are connected to the horizontal signal line $62_2$, and in a similar manner to follow, the pixels $61_{1,n}$ to $61_{m,n}$ are connected to the horizontal signal line $62_n$.

The vertical signal lines $63_1$ to $63_{m/2}$ connect the column processing unit 57 to the pixels $21_{1,1}$ to $21_{m,n}$ of two columns in a vertical direction. Namely, the pixels $61_{1,1}$ to $61_{1,n}$ and the pixels $61_{2,1}$ to $61_{2,n}$ are connected to the vertical signal line $63_1$, the pixels $61_{3,1}$ to $61_{3,n}$ and the pixels $61_{4,1}$ to $61_{4,n}$ are connected to the vertical signal line $63_2$, and in a similar manner to follow, the pixels $61_{m-1,1}$ to $61_{m-1,n}$ and the pixels $61_{m,1}$ to $61_{m,n}$ are connected to the vertical signal line $63_m$.

The drains of the load MOSs $55_1$ to $55_{m/2}$ are connected to the vertical signal lines $63_1$ to $63_{m/2}$, a bias voltage is applied to the gates, and the sources are grounded. The load MOS and an amplifying transistor 74 (FIG. 7) in each of the pixels $61_{1,1}$ to $61_{m,n}$ constitute a source follower circuit.

In accordance with a timing signal or the like from the timing control circuit 52, DAC 56 generates a ramp signal and supplies the ramp signal to the column processing unit 57.

In the column processing unit 57, m/2 ADCs $64_1$ to $64_{m/2}$ are disposed in parallel.

The ADCs $64_1$ to $64_{m/2}$ are connected to the vertical signal lines $63_1$ to $63_{m/2}$ respectively, and A/D convert pixel signals supplied via the vertical signal lines $63_1$ to $63_{m/2}$ by using a ramp signal supplied from DAC 56.

Each of the ADCs $64_1$ to $64_{m/2}$ has a comparator, a counter, a switch, and a memory. Namely, ADC $64_1$ has a comparator $65_1$, a counter (CNT) $66_1$, a switch $67_1$, and a memory $68_1$, ADC $64_2$ has a comparator $65_2$, a counter $66_2$, a switch $67_2$, and a memory $68_2$, and in a similar manner to follow, ADC $64_{m/2}$ has a comparator $65_{m/2}$, a counter $66_{m/2}$, a switch $67_{m/2}$, and a memory $68_{m/2}$.

The pixel signals are supplied from the pixels $61_{m,1}$ to $61_{m,n}$ to the comparators $65_1$ to $65_m$ via the vertical signal lines $63_1$ to $63_{m/2}$, and the ramp signal is supplied from DAC 56.

The comparators $65_1$ to $65_{m/2}$ compare the ramp signal supplied from DAC 56 with the pixel signals supplied via the vertical signal lines $63_1$ to $63_{m/2}$, and supply comparison signals representative of the comparison results to the counters $66_1$ to $66_{m/2}$. Namely, the comparator $65_1$ supplies a comparison signal between the ramp signal from DAC 56 and the pixel signals supplied from the pixels $61_{1,1}$ to $61_{1,n}$ and pixels $61_{2,1}$ to $61_{2,n}$ via the vertical signal line $63_1$, to the counter $66_1$.

The comparator $65_2$ supplies a comparison signal between the ramp signal from DAC 56 and the pixel signals supplied from the pixels $61_{3,1}$ to $61_{3,n}$ and pixels $61_{4,1}$ to $61_{4,n}$ via the vertical signal line $63_2$, to the counter $66_2$, and in a similar manner to follow, the comparator $65_{m/2}$ supplies a comparison signal between the ramp signal from DAC 56 and the pixel signals supplied from the pixels $61_{m-1,1}$ to $21_{m-1,n}$ and pixels $61_{m,1}$ to $61_{m,n}$ via the vertical signal line $63_{m/2}$, to the counter $26_{m/2}$.

The counters $66_1$ to $66_{m/2}$ are supplied with a clock signal from the timing control circuit 52, and count the clock signals on the basis of the comparison signal from the comparators $65_1$ to $65_{m/2}$. The count values representative of the count results of clock signals by the counters $66_1$ to $66_{m/2}$ are supplied to the memories $68_1$ to $68_{m/2}$ via the switches $67_1$ to $67_{m/2}$, as pixel data obtained by A/D conversion of the pixel signal.

In response to the timing signal from the timing control circuit 52, the switches $67_1$ to $67_{m/2}$ couple the counters $66_1$ to $66_{m/2}$ and the memories $68_1$ and $68_{m/2}$, respectively.

The memories $68_1$ to $68_{m/2}$ temporarily store the pixel data supplied from the counters $66_1$ to $66_{m/2}$, and output the pixel data to the horizontal output line 59 under control of the column scanner 58.

The column scanner 58 sequentially outputs the pixel data stored in the memories $68_1$ to $68_{m/2}$ to the horizontal output line 59 at a predetermined timing.

The horizontal output line 59 is connected to an image processing circuit or the like at the succeeding stage, and supplies the pixel data output from the memories $68_1$ to $68_{m/2}$ to an image processing circuit and the like.

As described above, in the CMOS sensor 51, the pixels $61_{1,1}$ to $61_{m,n}$ of two columns at a time are connected to one vertical signal line 63, and the pixel signals of two columns are A/D converted by one ADC 64.

Next, with reference to FIG. 7, the 2×2 sharing pixel constituted of four pixels will be described.

Figure 7:
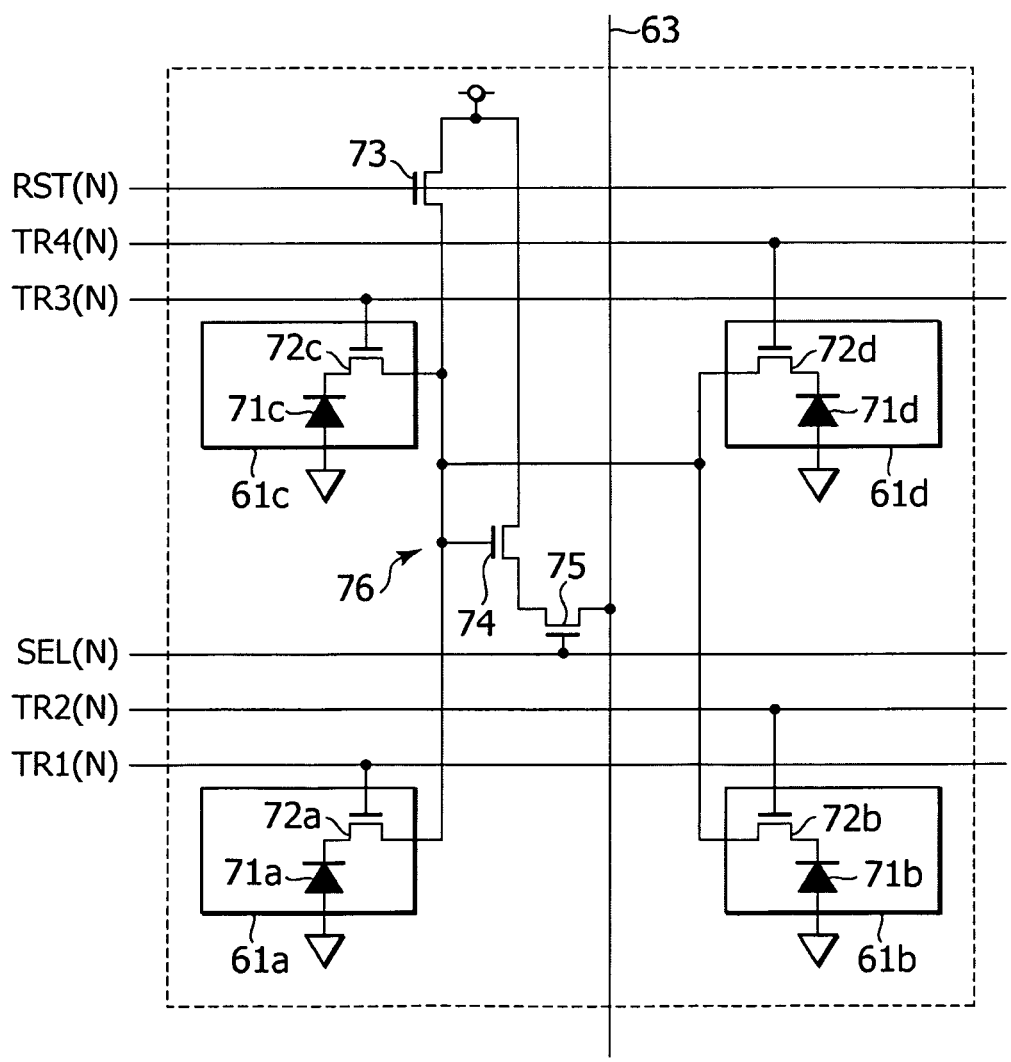
FIG. 7 is a diagram explaining a 2×2 sharing pixel constituted of four pixels.

As shown in FIG. 7, the 2×2 sharing pixel is constituted of four pixels 61a to 61d. The pixel 61a is a pixel at the N-th row in an odd column, the pixel 61b is a pixel at the N-th row in an even column, the pixel 61c is a pixel at the (N+1)-th row in an odd column, and the pixel 61d is a pixel at the (N+1)-th row in an even column.

The pixel 61a includes a photodiode 71a and a transfer transistor 72a, and the pixel 61b includes a photodiode 71b and a transfer transistor 72b. The pixel 61c includes a photodiode 71c and a transfer transistor 72c, and the pixel 61d includes a photodiode 71d and a transfer transistor 72d.

In the 2×2 sharing pixel, the four pixels 61a to 61d share the reset transistor 73, amplifying transistor 74, select transistor 75, and floating diffusion 76. Namely, the photodiodes 71a to 71d are coupled to the floating diffusion 76 via the transfer transistors 72a to 72d.

After the floating diffusion 76 is clamped to a predetermined reference potential in response to a reset signal RST (N) for controlling the reset transistor 73, the electric charge generated by the photodiode 71a is transferred to the floating diffusion 76 in response to a transfer signal TR1 (N) for controlling the transfer transistor 72a, and accumulated therein. The electric charge accumulated in the floating diffusion are outputted to the vertical signal line 63 via the select transistor 75, as a pixel signal of the pixel 61a.

In succession to the output of the pixel signal of the pixel 61a, after the floating diffusion 76 is clamped to a predetermined reference potential in response to the reset signal RST (N) for controlling the reset transistor 73, the electric charge generated by the photodiode 71b is transferred to the floating diffusion 76 in response to a transfer signal TR2 (N) for controlling the transfer transistor 72b, and a pixel signal of the pixel 61b is outputted to the vertical signal line 63 similar to the pixel 61a. In a similar manner to follow, the electric charge generated by the photodiode 71c is transferred to the floating diffusion 76, and a pixel signal of the pixel 61c is outputted to the vertical signal line 63, and the electric charge generated by the photodiode 71d is transferred to the floating diffusion 76, and a pixel signal of the pixel 61d is outputted to the vertical signal line 63.

As described above, in the 2×2 sharing pixel constituted of four pixels 61a to 61d, the floating diffusion 76 and vertical signal line 63 are provided for the pixels 61a to 61d.

Figure 8:
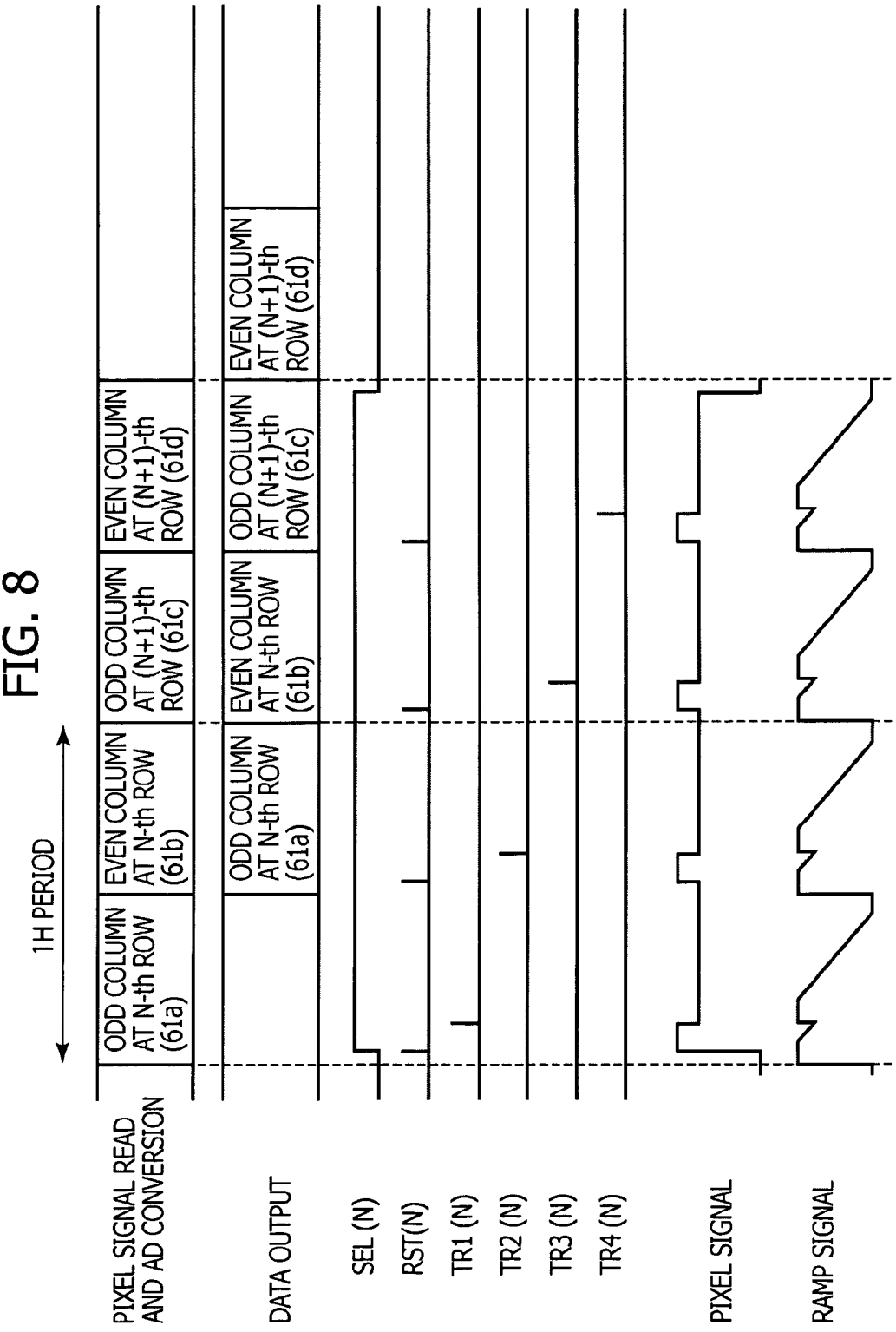
FIG. 8 is a timing chart illustrating an example of the operation of a CMOS sensor 51.

FIG. 8 is a timing chart illustrating the operation of the CMOS sensor 51.

As a 1H period for reading pixel signals at the N-th row starts, a select signal SEL (N) for controlling the select transistor 75 shown in FIG. 7 transits from an L level to an H level to start reading pixel signals from the 2×2 sharing pixel constituted of four pixels 61a to 61d shown in FIG. 7.

After the select signal SEL (N) transits from the L level to the H level, a reset signal RST (N) for controlling the reset transistor 73 becomes H level with a pulsed form, and in response to this reset signal RST (N), the floating diffusion 76 is clamped to a predetermined reference potential to perform A/D conversion at a reset level (P phase).

Thereafter, a transfer signal TR1 (N) for controlling the transfer transistor 72a becomes H level with a pulsed form, and in response to the transfer signal TR1 (N), the electric charge generated by the photodiode 71a of the pixel 61a is transferred to the floating diffusion 76 to perform A/D conversion at a data level (D phase).

The A/D conversion at the reset level and the A/D conversion at the data level will be described herebelow.

As shown in the second lowermost field of FIG. 8, when the floating diffusion 76 is clamped to the predetermined reference potential, a pixel signal corresponding to the reference potential is outputted. Thereafter, as the electric charges generated by the photodiode 71a are transferred to the floating diffusion 76, a pixel signal corresponding to the electric charges is outputted.

The pixel signal is inputted to one terminal of the comparator 65 (FIG. 6) via the select transistor 75 and vertical signal line 63. A ramp signal shown in the lowermost field of FIG. 8 is supplied to the other terminal of the comparator 65.

The comparator 65 compares the pixel signal with the ramp signal after the potentials at the input terminals are reset by internally shortening both the input terminals. The comparator 65 supplies a comparison result signal representative of the comparison result to the counter 66. For example, the comparator 65 outputs an L level comparison result signal if the pixel signal is not smaller than the ramp signal, and an H level comparison result signal if the pixel level is smaller than the ramp signal. Namely, the comparator 65 outputs a comparison result signal which transits from the H level to L level when the ramp signal becomes equal to the pixel signal while the voltage of the ramp signal lowers at a constant slope.

While the pixel signal at the reset level is outputted, the counter 66 uses a count value (time) from the time when the ramp signal starts lowering at a constant slope and the time when the comparison result signal transits from the H level to L level, as an A/D conversion value of the pixel signal at the reset level. While the pixel signal at the data level is output, the counter 66 uses a count value from the time when the ramp signal starts lowering at a constant slope and the time when the comparison result signal transits from the H level to L level, as an A/D conversion value of the pixel signal at the data level.

A difference between the A/D conversion value of the pixel signal at the reset level and the A/D conversion value of the pixel signal at the data level is stored in the memory 68 (FIG. 6) as pixel data.

In the manner described above, the pixel data read from the pixel 61*a* is A/D converted and the pixel data of the pixel 61*a* is stored in the memory 68. Thereafter, the reset signal RST (N) for controlling the reset transistor 73 becomes H level with a pulsed form, and in response to this reset signal RST (N), the floating diffusion 76 is clamped to the predetermined reference potential. Namely, the electric charge generated by the photodiode 71*a* of the pixel and accumulated in the floating diffusion 76 are reset.

Thereafter, a transfer signal TR2 (N) for controlling the transfer transistor 72*b* becomes H level with a pulsed form, and in response to the transfer signal TR2 (N), the electric charge generated by the photodiode 71*b* of the pixel 61*b* is transferred to the floating diffusion 76. Thereafter, similar to the A/D conversion of the pixel signal read from the pixel 61*a*, a pixel signal read from the pixel 61*b* is A/D converted. In parallel with the A/D conversion of the pixel signal of the pixel 61*b*, the pixel data of the pixel 61*a* stored in the memory 68 is outputted to the horizontal output line 59 under control of the column scanner 58.

After the 1H period for reading pixel signals at the N-th line ends, another 1H period for reading pixel signals at the (N+1)-th line starts. The reset signal RST (N) for controlling the reset transistor 73 becomes H level with a pulsed form to reset the electric charge generated by the photodiode 71*b* of the pixel 61*b* and accumulated in the floating diffusion 76.

Thereafter, a transfer signal TR3 (N) for controlling the transfer transistor 72*c* becomes H level with a pulsed form, and in response to the transfer signal TR3 (N), the electric charge generated by the photodiode 71*c* of the pixel 61*c* is transferred to the floating diffusion 76. In parallel with the A/D conversion of the pixel signal of the pixel 61*c*, the pixel data of the pixel 61*b* stored in the memory 68 is outputted to the horizontal output line 59 under control of the column scanner 58.

Thereafter, the reset signal RST (N) for controlling the reset transistor 73 becomes H level with a pulsed form to reset the electric charge generated by the photodiode 71*c* of the pixel 61*c* and accumulated in the floating diffusion 76.

Thereafter, a transfer signal TR4 (N) for controlling the transfer transistor 72*d* becomes H level with a pulsed form, and in response to the transfer signal TR4 (N), the electric charge generated by the photodiode 71*d* of the pixel 61*d* is transferred to the floating diffusion 76. In parallel with the A/D conversion of the pixel signal of the pixel 61*d*, the pixel data of the pixel 61*c* stored in the memory 68 is outputted to the horizontal output line 59 under control of the column scanner 58. The pixel data of the pixel 61*d* stored in the memory 68 is outputted to the horizontal output line 59 during the next 1H period.

As described above, in the CMOS sensor 51, ADC 64 performs A/D conversion twice during the 1H period to output pixel data of one row.

As shown in the uppermost field of FIG. 8, the CMOS sensor 51 reads the pixel signal and performs the A/D conversion in the order of the pixel 61*a* at the N-th row in the odd column, pixel 61*b* at the N-th row in the even column, pixel 61*c* at the (N+1)-th row in the odd column and pixel 61*d* at the (N+1)-th row in the even column. The pixel data is outputted to the horizontal output line in the order of the pixel 61*a* at the N-th row in the odd column, pixel 61*b* at the N-th row in the even column, pixel 61*c* at the (N+1)-th row in the odd column and pixel 61*d* at the (N+1)-th row in the even column. Namely, in the CMOS sensor 51, since the pixel data in the odd column is outputted and then the pixel data in the even column is outputted, the processing circuit at the succeeding stage rearranges the order of pixel data to make the pixel data have the same order of pixels to thereby form an image.

Since one ADC 64 performs the A/D conversion of pixel signals of two columns, ADCs $64_1$ to $64_{m/2}$ can be disposed in parallel at a pitch twice that of the pixels $61_{1,1}$ to $61_{m,n}$. Even if the pitch of the pixels $61_{1,1}$ to $61_{m,n}$ is narrow, ADCs $64_1$ to $64_{m/2}$ can be laid out easily. The number of ADCs 64 can be halved as compared to the case in which ADC 64 is not shared by pixels of two columns. Since the area of the column processing unit 57 is reduced, the CMOS sensor 51 can be made compact. Since the number of ADCs 64 is reduced, it is advantageous to the streaking characteristics such as stripes appearing on an image.

Further, as described with reference to FIG. 7, since the four pixels 61*a* to 61*d* share the reset transistor 73, amplifying transistor 74, and select transistor 75, the number of transistors can be reduced as compared to the case in which these transistors are not shared. It is therefore possible to improve the photographing characteristics such as the saturated charge amount and the sensitivity. Even if the CMOS sensor 51 is made compact, it is possible to suppress an image quality from being degraded, by increasing an aperture ratio of each pixel.

Figure 1:
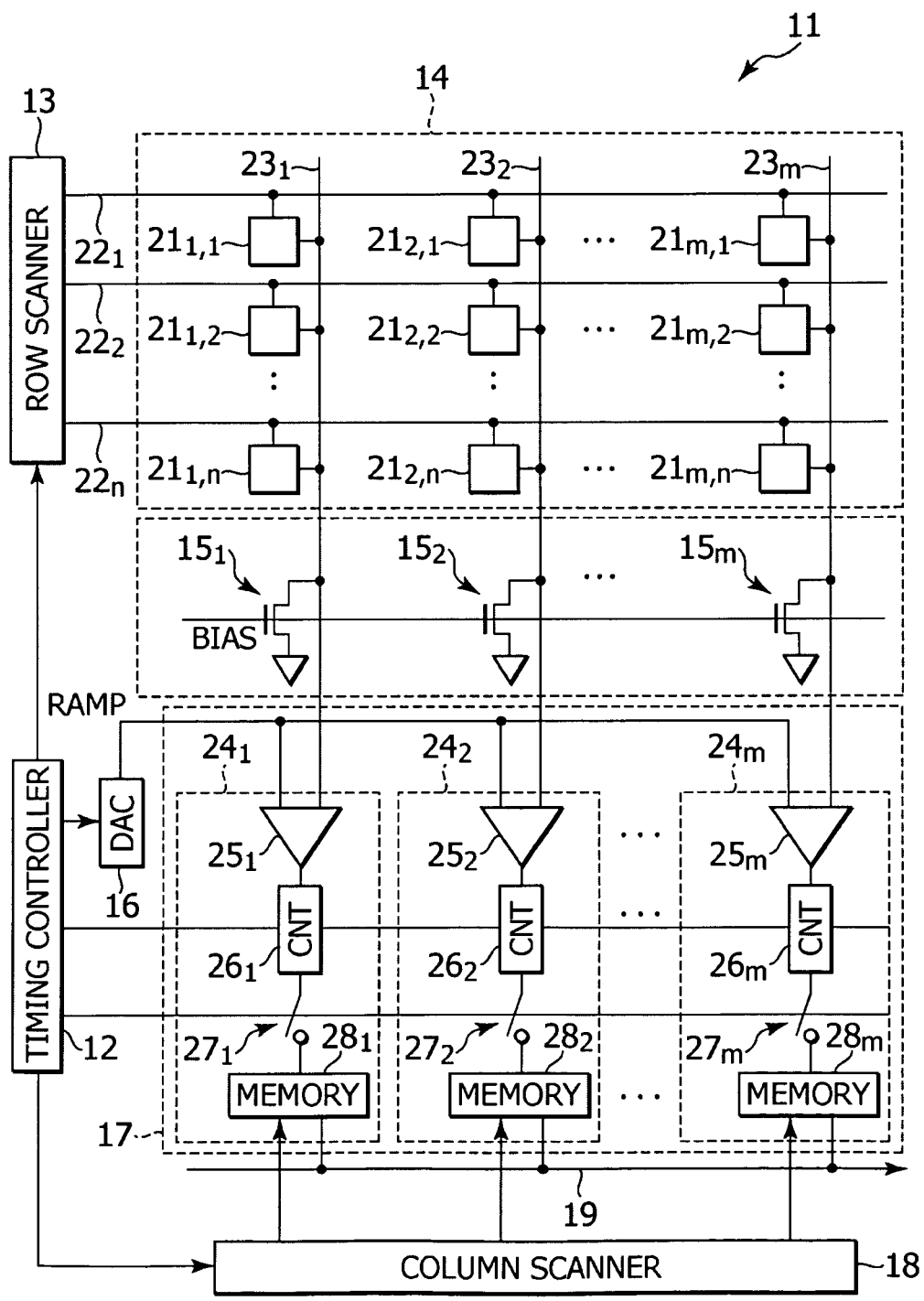
FIG. 1 is a block diagram showing an example of the structure of a CMOS sensor mounting column parallel ADCs.
Figure 2:
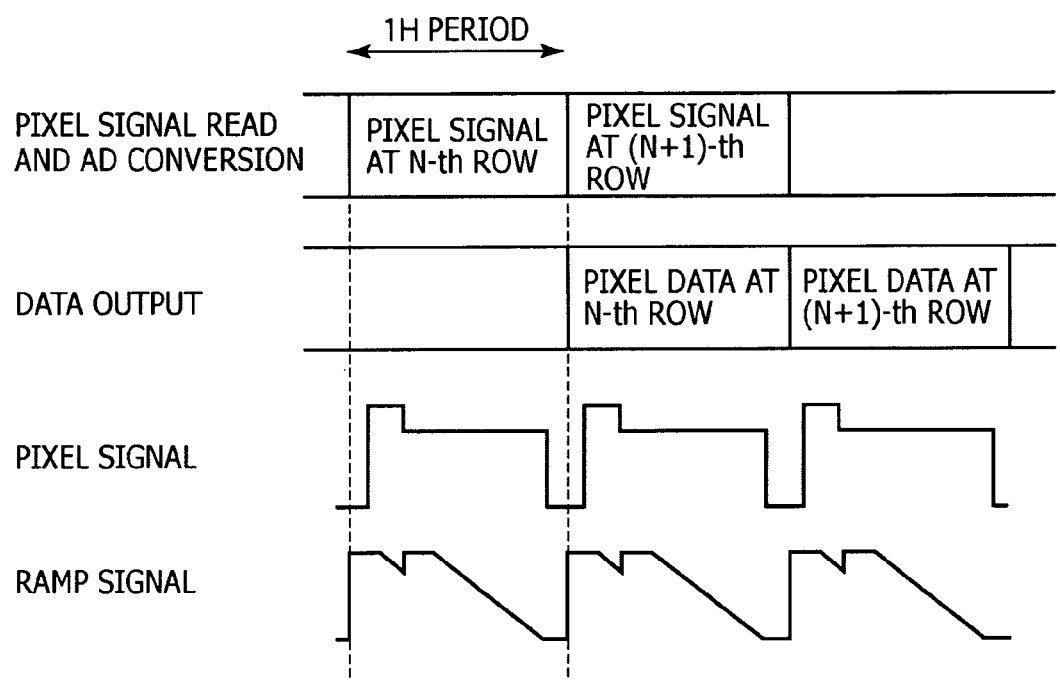
FIG. 2 is a timing chart explaining the operation of a CMOS sensor 11.
Figure 3:
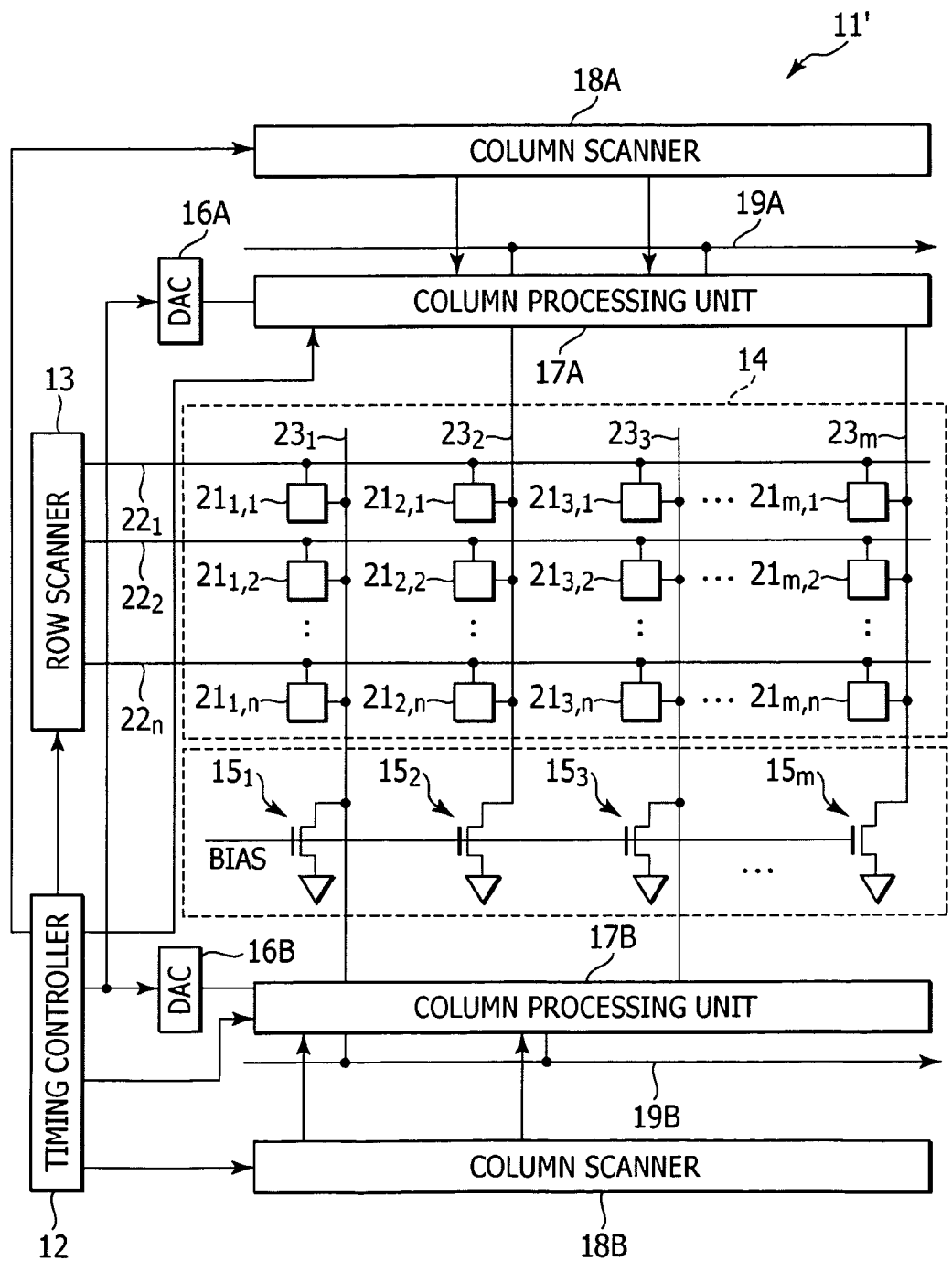
FIG. 3 is a timing chart explaining the operation of a CMOS sensor 11'.
Figure 4:
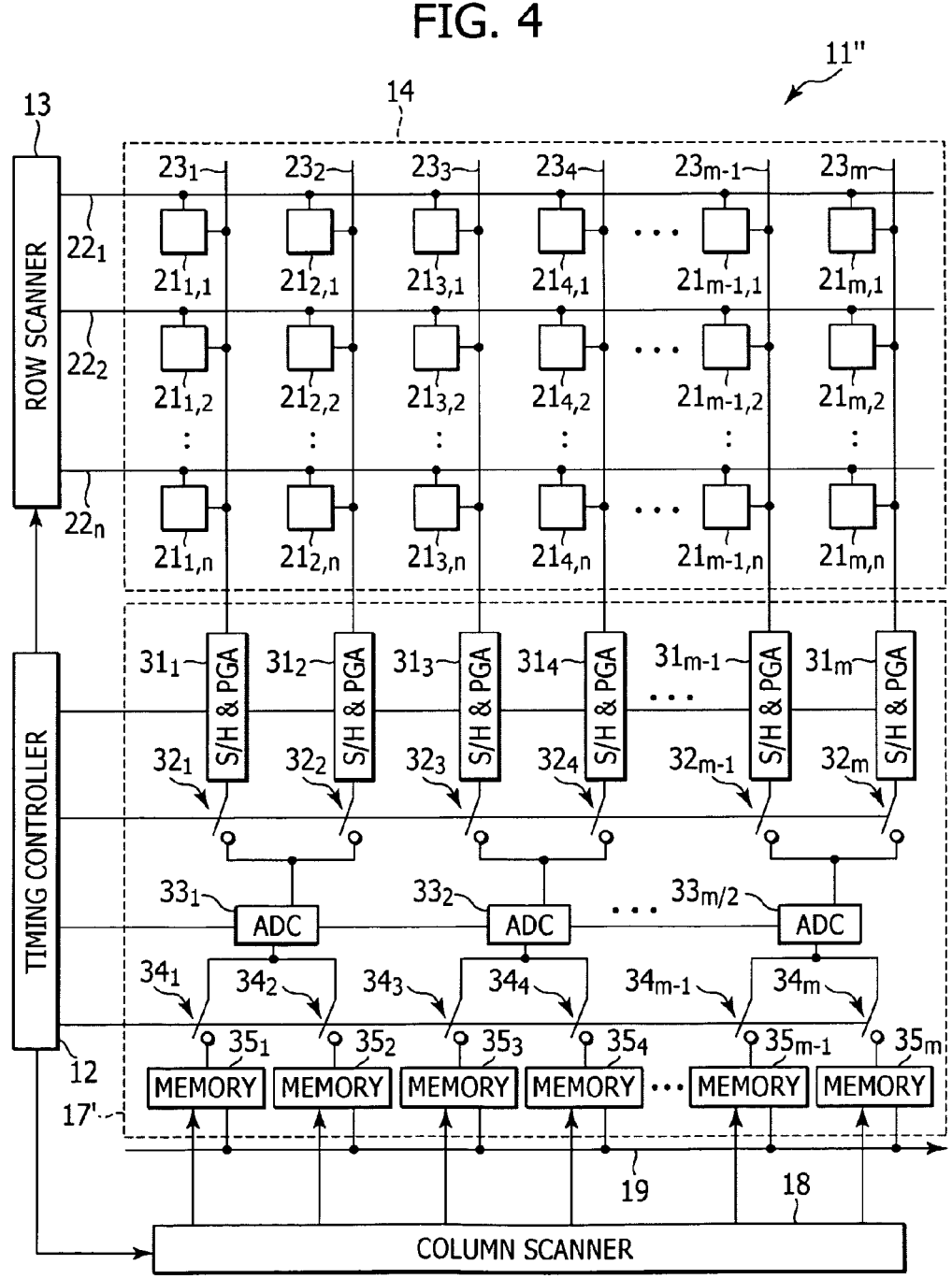
FIG. 4 is a timing chart explaining the operation of a CMOS sensor 11".

Furthermore, in the CMOS sensor 51, as described with reference to FIG. 3, the image quality degradation to be caused by disposing the column processing unit in two areas does not occur. In addition, a problem to be caused by holding analog pixel signals in capacitors as described with reference to FIG. 4 does not occur.

In the CMOS sensor 51, as described above, a pixel value is sequentially read from each pixel, and in addition, the electric charges outputted from a plurality of pixels are added together by the floating diffusion 76 so that a pixel signal corresponding to the added electric charges can be read.

Figure 9:
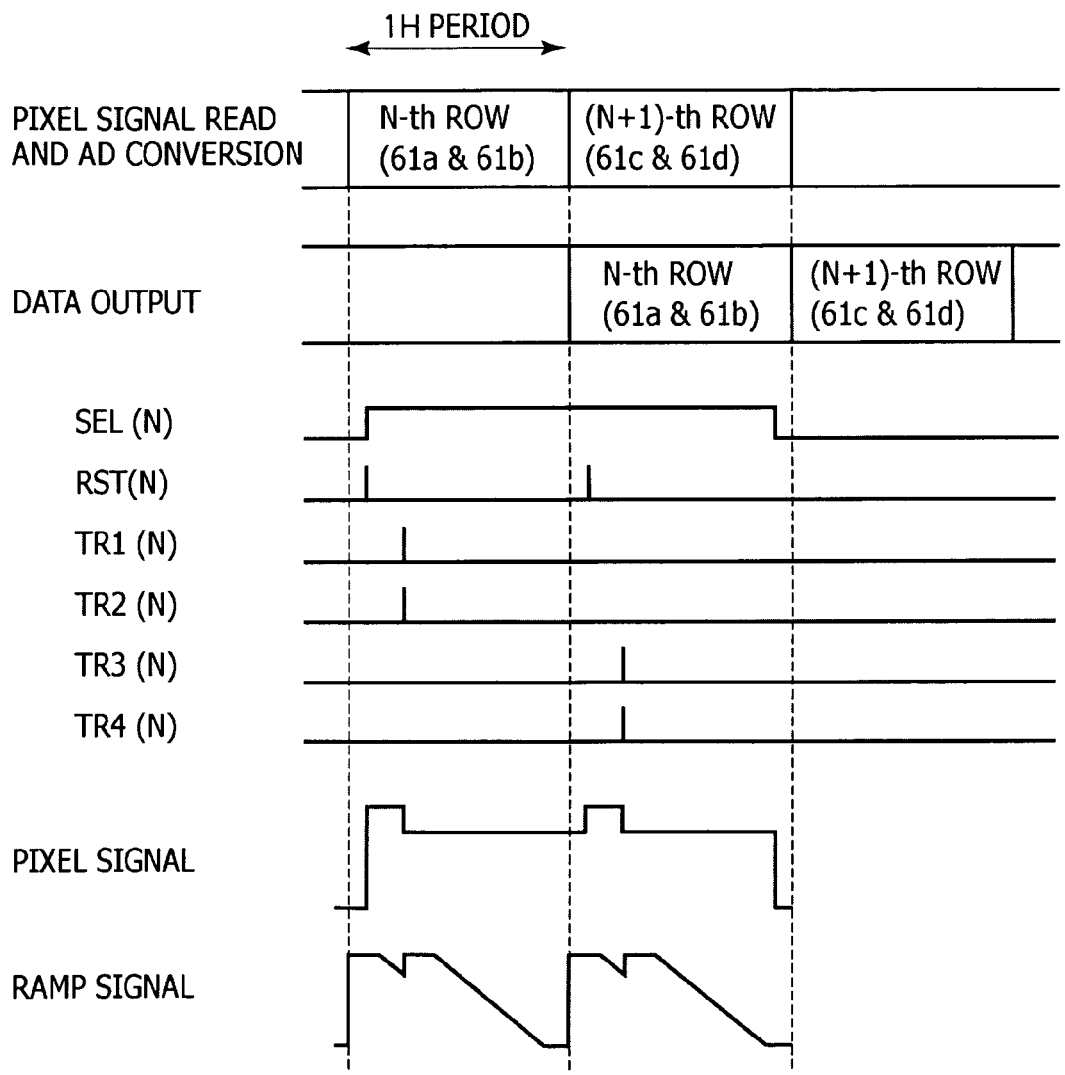
FIG. 9 is a timing chart illustrating another example of the operation of the CMOS sensor 51.

FIG. 9 is a timing chart illustrating another example of the operation of the CMOS sensor 51.

With reference to FIG. 9, description will be made on an example of addition of electric charges of two pixels disposed in a horizontal direction, e.g., addition of electric charges of the pixels 61*a* and 61*b* shown in FIG. 7 and addition of electric charges of the pixels 61*c* and 61*d*.

After a select signal SEL (N) transits from an L level to an H level, a reset signal RST (N) becomes H level with a pulsed from, and the floating diffusion 76 is clamped to a predetermined reference potential to perform A/D conversion at the reset level.

Thereafter, a transfer signal TR1 (N) and a transfer signal TR2 (N) become H level with a pulsed form at the same time, and in response to the transfer signal TR1 (N) and transfer signal TR2 (N), electric charges generated by the photodiodes 71*a* and 71*b* are transferred to the floating diffusion 76 at the same time.

At the result, in the floating diffusion 76, electric charges generated by the photodiodes 71*a* and 71*b* are added, and by using a pixel signal corresponding to the added electric charges, the A/D conversion at the data level is performed. A difference between the A/D conversion value at the reset level and the A/D conversion value at the data level is stored in the memory 68 as pixel data.

After the 1H period for reading pixel signals of the N-th row ends, the reset signal RST (N) becomes H level with a pulsed form, and the floating diffusion 76 is clamped to the predetermined reference potential, i.e. the accumulated charges are reset, to perform the A/D conversion at the reset level.

Thereafter, similar to the A/D conversion of the pixel signal obtained through addition of the photodiodes 71a and 71b, electric charges generated by the photodiodes 71c and 71d are added, and by using a pixel signal corresponding to the added electric charges, the A/D conversion at the data level is performed.

In parallel with the A/D conversion of the pixel signal obtained through addition of the photodiodes 71c and 71d, pixel data obtained by the A/D conversion of the pixel signal obtained through addition of the photodiodes 71a and 71b is outputted from the memory 68 to the horizontal output line 59. The pixel data obtained by the A/D conversion of the pixel signal obtained through addition of the photodiodes 71c and 71d is outputted during the next 1H period.

As described above, electric charges from two pixels are added at the floating diffusion 76, and a pixel signal corresponding to the added electric charges is read. It is therefore possible to double a frame rate at which an image is photographed.

Since electric charges are added at the floating diffusion 76, the number of AD conversion processes can be reduced and noises can be reduced, for example, as compared to the case in which pixel signals from two pixels are A/D converted and thereafter the pixel data is added digitally. More specifically, since noises contained in an image signal increase by square in an A/D conversion process, noises of the amplifying transistor 74 and noises of ADC 64 can be reduced by $1/\sqrt{2}$, in correspondence with a reduction in the number of A/D conversion processes.

Figure 10:
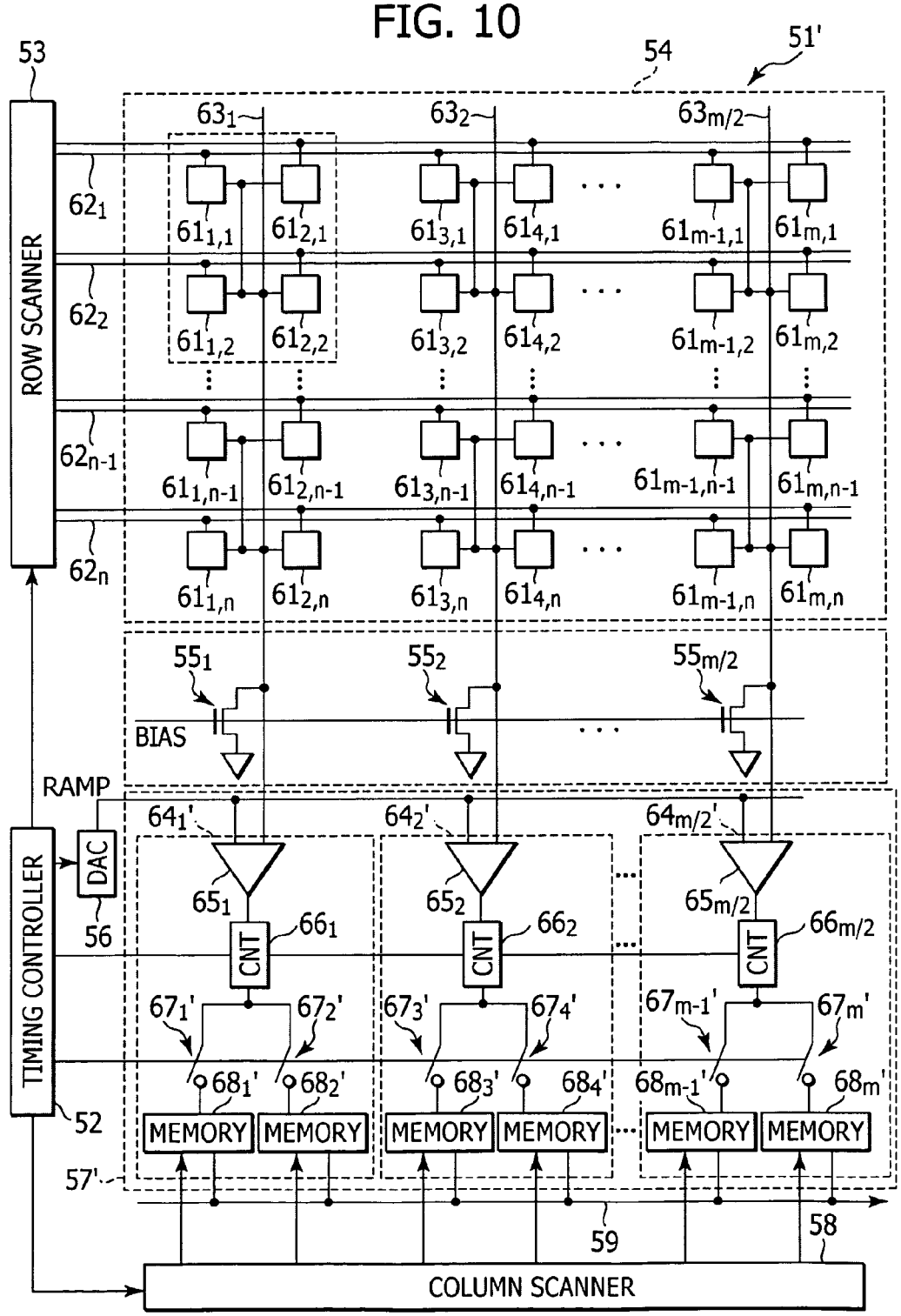
FIG. 10 is a block diagram showing an example of the structure of a CMOS sensor according to another embodiment.

FIG. 10 is a block diagram showing an example of the structure of a CMOS sensor according to another embodiment.

In FIG. 10, a CMOS sensor 51' includes a timing control circuit 52, a row scanner 53, a pixel array 54, m/2 load MOSs $55_1$ to $55_{m/2}$, a DAC 56, a column processing unit 57', a column scanner 58, and a horizontal output line 59. In FIG. 10, similar components to those of the CMOS sensor 51 shown in FIG. 6 are represented by identical reference symbols, and the description thereof is omitted in the following where appropriate.

Namely, the CMOS sensor 51' shown in FIG. 10 is similar to the CMOS sensor 51 shown in FIG. 6 in that the CMOS sensor 51' includes the timing control circuit 52, row scanner 53, pixel array 54, m/2 load MOSs $55_1$ to $55_{m/2}$, DAC 56, a column scanner 58, and a horizontal output line 59. The CMOS sensor 51' includes the column processing unit 57' which is different from that of the CMOS sensor 51.

The column processing unit 57' includes m/2 ADCs $64_1$ to $64_{m/2}$ disposed in parallel. Each of the ADCs $64_1$ to $64_{m/2}$ includes a comparator, a counter, two switches, and two memories.

Namely, the ADC 641 includes a comparator 651, a counter (CNT) $66_1$, two switches $67_1'$ and $67_2'$, and two memories 681' and $68_2'$. The ADC $64_2$ includes a comparator $65_2$, a counter $66_2$, two switches $67_3'$ and $67_4'$, and two memories $68_3'$ and $68_4'$, and in a similar manner to follow, the ADC $64_{m/2}$ includes a comparator $65_{m/2}$, a counter $66_{m/2}$, two switches $67_{m-1}'$ and $67_m'$, and two memories $68_{m-1}'$ and $68_m'$.

In the CMOS sensor 51' constructed as above, for example, pixel data of pixels in an odd column and pixel data of pixels in an even column among the pixels $61_{1,1}$ to $61_{m,n}$ can be stored in different memories.

For example, during the 1H period for reading the pixels $61_{1,N}$ to $61_{m,N}$ at the N-the rows, as the counter $66_1$ of ADC $64_1'$ A/D converts a pixel signal of the pixel $61_{1,N}$ in the first column, the switch $67_1'$ is coupled to the memory $68_1'$, and pixel data of the pixel $61_{1,N}$ in the first column is stored in the memory $68_1'$. As the counter $66_1$ performs A/D conversion of a pixel signal of the pixel $61_{2,N}$ in the second column, the switch $67_2'$ is coupled to the memory $68_2'$, and pixel data of the pixel $61_{2,N}$ in the second column is stored in the memory $68_2'$.

Similarly, in ADC $64_2'$, the pixel data of the pixel $61_{3,n}$ in the third column is stored in the memory $68_3'$, and pixel data of the pixel $61_{4,n}$ in the fourth column is stored in the memory $68_4'$. In ADC $64_m'$, the pixel data of the pixel $61_{m-1,n}$ in the (m−1) column is stored in the memory $68_{m-1}'$, and pixel data of the pixel $61_{m,n}$ in the m-th column is stored in the memory $68_m'$.

As described above, by storing pixel data of pixels in an odd column and pixel data of pixels in an even column in different memories, pixel data of the pixel $61_{1,N}$ in the first column to pixel data of the pixel $61_{m,N}$ in the m-th column can be outputted sequentially to the horizontal output line 59, under control of the column scanner 58.

Namely, as described with reference to FIG. 8, in the CMOS sensor 51, a pixel data order rearrangement process is performed by a processing circuit at the succeeding stage to rearrange the order of pixels. In the CMOS sensor 51', the pixel data is outputted in the order of pixels. As a result, it is not necessary to perform the rearrangement process of pixel data order.

Figure 11:
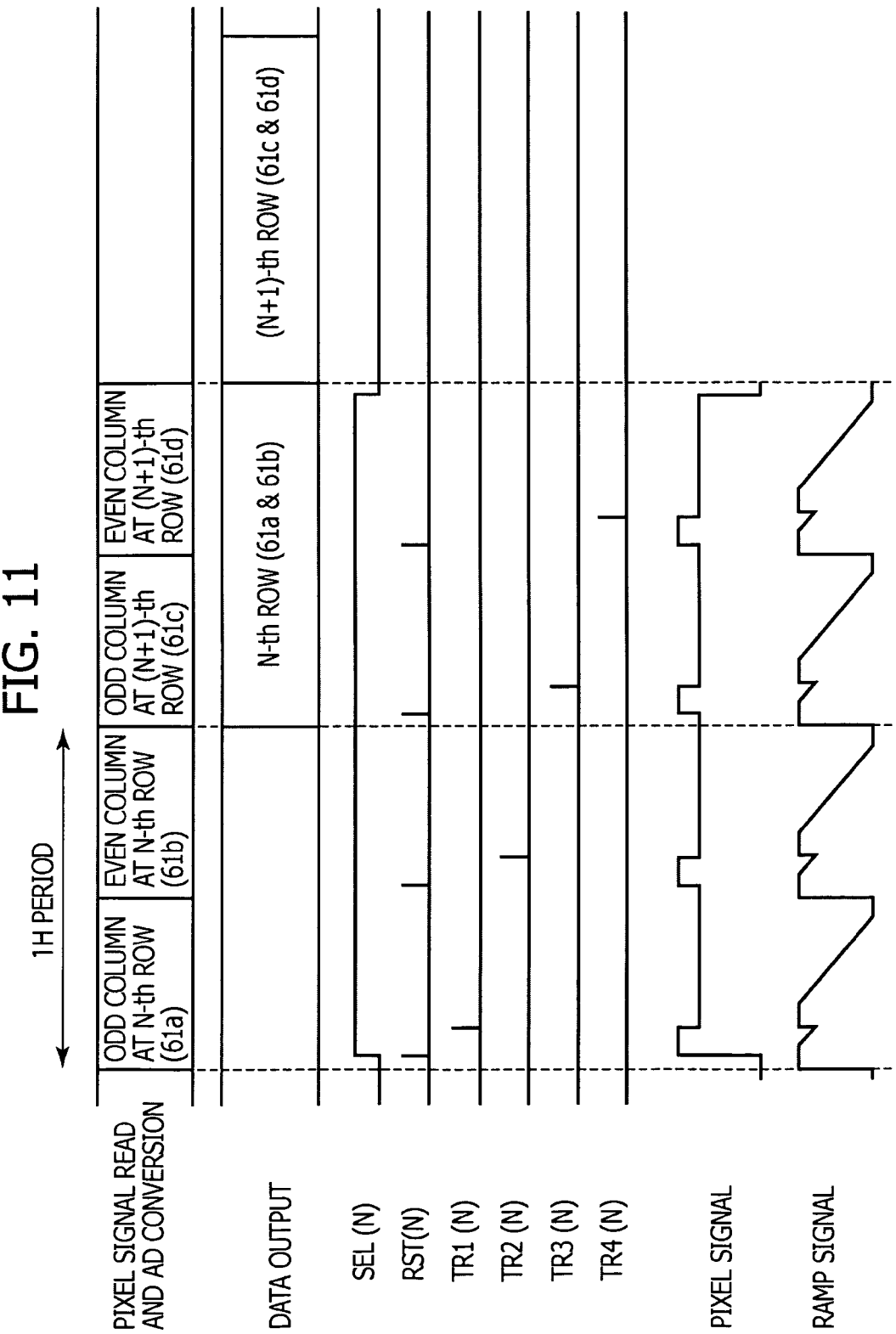
FIG. 11 is a timing chart illustrating an example of the operation of a CMOS sensor 51'.

FIG. 11 is a timing chart illustrating an example of the operation of the CMOS sensor 51'.

As shown in FIG. 11, during the 1H period for reading pixel signals at the N-th row, a pixel signal of the pixel 61a at the N-th row in an odd column is read, and thereafter a pixel signal of the pixel 61b at the N-th row in an even column is read. Thereafter, during the 1H period for reading pixel signals at the (N+1)-th row, a pixel signal of the pixel 61c at the (N+1)-th row in an odd column is read, and thereafter in parallel with reading a pixel signal of the pixel 61d at the (N+1)-th row in an even column, pixel data at the N-th row is output in the order of pixels. Pixel data at the (N+1)-th row is outputted in the order of pixels during the next 1H period. In FIG. 11, the select signal SEL (N), the reset signal RST (N), the transfer signals TR1 to TR4, the pixel signal and the ramp signal are the same as those shown in the timing chart of FIG. 8.

In embodiments of the present invention, the 2×2 sharing pixel in which vertical two pixels×horizontal two pixels 61a to 61d share the amplifying transistor and the like has been described. For example, in order to make the pitch of ADCs broader than that of pixels, it is sufficient if at least a plurality of pixels in the horizontal direction share the amplifying transistor and the like. Namely, even if the sharing pixel having two pixels in the horizontal direction shares the amplifying transistor and the like, ADCs can be laid out easily similar to the 2×2 sharing pixel.

Embodiments of the present invention are not limited only to the above-described embodiments, but various modifications are possible without departing from the gist of the present invention.

What is claimed is:

1. An image pickup apparatus comprising:
a plurality of photoelectric conversion means for converting incident light into an electric charge and accumulating the electric charge;
a plurality of transfer means for transferring the electric charge accumulated in the plurality of photoelectric conversion means;
conversion means for converting the electric charge in the photoelectric conversion means transferred via the transfer means into a voltage;
reset means for resetting a potential of the conversion means;
amplification means for amplifying a voltage converted by the conversion means to generate a pixel signal;
selection means for selectively outputting the pixel signal to a read signal line for reading the pixel signal;
a plurality of analog-to-digital (A/D) conversion means, wherein each of the plurality of A/D conversion means is shared between two columns of photoelectric conversion means, at least one of the plurality of A/D conversion means converting the pixel signal read via the read signal line into a digital signal;
a metal oxide semiconductor (MOS) transistor connected to the read signal line between the selection means and the at least one A/D conversion means, the MOS transistor being shared between the two columns of photoelectric conversion means;
wherein,
the plurality of the photoelectric conversion means and the plurality of transfer means comprise a plurality of columns and a plurality of rows to form a common unit by sharing the reset means, the amplification means, the selection means, and the conversion means, and
the at least one A/D conversion means is configured to provide one or more A/D conversions from a plurality of photoelectric conversion means included in a first pixel row of the common unit during a first scan period of reading the pixel signal in a horizontal direction, and provide one or more A/D conversions from a plurality of photoelectric conversion means included in a second pixel row of the common unit during a second scan period of reading the pixel signal in the horizontal direction.

2. The image pickup apparatus according to claim 1, further comprising a control line for transmitting a signal for controlling a transfer of the electric charge, wherein the control line is independent for each of the plurality of the transfer means of the common unit sharing the amplification means and the read signal line.

3. The image pickup apparatus according to claim 2, wherein in response to the signal for controlling the electric charges for each of the plurality of the transfer means, a plurality of transfer means for the common unit transfer an electric charge at the same time such that the pixel signal corresponds to an addition of the electric charges; and
the at least one A/D conversion means provides an A/D conversion of the pixel signal corresponding to the added electric charges from a plurality of photoelectric conversion means included in a first pixel row of the common unit during a first scan period of reading the pixel signal in a horizontal direction, and provides an A/D conversion of the pixel signal corresponding to the added electric charges from a plurality of photoelectric conversion means included in a second pixel row of the common unit during a second scan period of reading the pixel signal in the horizontal direction.

4. The image pickup apparatus according to claim 1, wherein the metal oxide semiconductor transistor and the amplification means constitute a source follower circuit.

5. The image pickup apparatus according to claim 4, wherein a pitch of the at least one A/D conversion means is twice as wide as the photoelectric conversion means in a horizontal direction.

6. The image pickup apparatus according to claim 4, wherein the at least one A/D conversion means further comprises:
comparison means having a first input terminal for receiving the pixel signal and a second input terminal for receiving a reference voltage lowering from a predetermined reference potential at a constant slope, the comparison means comparing the pixel signal inputted to the first input terminal with the reference voltage inputted to the second input terminal, after a potential at the first and second input terminals are reset; and
measurement means for measuring a time from when the reference voltage starts lowering from the predetermined reference potential at the constant slope to when the comparison means judges that the reference voltage becomes lower than the pixel signal.

7. The image pickup apparatus according to claim 6, wherein the at least one A/D conversion means includes one or more hold means for holding a value measured with the measurement means; as the pixel signal converted into a digital signal.

8. The image pickup apparatus according to claim 7, wherein the at least one A/D conversion means outputs the pixel signal converted into the digital signal in the order of the photoelectric conversion means in the horizontal direction.

9. An image pickup apparatus for photographing an image, comprising:
a plurality of photoelectric converters, each photoelectric converter configured to convert incident light into an electric charge and accumulate the electric charge;
a plurality of transfer elements, each transfer element configured to transfer the electric charge accumulated in the photoelectric converter;
a converter configured to convert the electric charge in the photoelectric conversion unit transferred via the transfer element into a voltage;
a reset element configured to reset a potential of the converter;
an amplifier configured to amplify a voltage converted by the converter to generate a pixel signal;
a selection transistor configured to selectively output the pixel signal to a read signal line for reading the pixel signal;
a plurality of analog-to-digital (A/D) converters, wherein each of the plurality of A/D converters is shared between two columns of photoelectric converters, at least one of the plurality of A/D converters configured to convert the pixel signal read via the read signal line into a digital signal; and
a metal oxide semiconductor (MOS) transistor connected to the read signal line between the selection transistor and the at least one A/D converter, the MOS transistor being shared between the two columns of photoelectric converters,
wherein,
the plurality of the photoelectric converters and the plurality of transfer elements comprise a plurality of columns and a plurality of rows to form a common unit by sharing the reset element, the amplifier, the selection transistor, and the converter, and the at least one A/D converter is configured to provide one or more A/D conversions from a plurality of photoelectric converters included in a first pixel row of the common unit during a first scan period of reading the pixel signal in a horizontal direction, and provide one or more A/D conversions from a plurality of photoelectric converters included in a second pixel row of the common unit during a second scan period of reading the pixel signal in the horizontal direction.

10. The image pickup apparatus according to claim 9, further comprising a control line for transmitting a signal for controlling a transfer of the electric charge, wherein the control line is independent for each of the plurality of the transfer elements of the common unit sharing the amplifier and the read signal line.

11. The image pickup apparatus according to claim 10, wherein in response to the signal for controlling the electric charges for each of the plurality of the transfer elements, a plurality of transfer elements for the common unit transfer an electric charge at the same time such that the pixel signal corresponds to an addition of the electric charges; and the at least one A/D converters provides an A/D conversion of the pixel signal corresponding to the added electric charges from a plurality of photoelectric conversion converters included in a first pixel row of the common unit during a first scan period of reading the pixel signal in a horizontal direction, and provides an A/D conversion of the pixel signal corresponding to the added electric charges from a plurality of photoelectric converters included in a second pixel row of the common unit during a second scan period of reading the pixel signal in the horizontal direction.

12. The image pickup apparatus according to claim 9, wherein the metal oxide semiconductor transistor and the amplifier constitute a source follower circuit.

13. The image pickup apparatus according to claim 12, wherein a pitch of the at least one A/D converter is twice as wide as the photoelectric converter in a horizontal direction.

14. The image pickup apparatus according to claim 12, wherein the at least one A/D converter further comprises:

a comparator having a first input terminal for receiving the pixel signal and a second input terminal for receiving a reference voltage lowering from a predetermined reference potential at a constant slope, the comparator comparing the pixel signal inputted to the first input terminal with the reference voltage inputted to the second input terminal, after a potential at the first and second input terminals are reset; and a measurement element for measuring a time from when the reference voltage starts lowering from the predetermined reference potential at the constant slope to when the comparator judges that the reference voltage becomes lower than the pixel signal.

15. The image pickup apparatus according to claim 14, wherein the at least one A/D converter includes one or more memories for holding a value measured with the measurement element as the pixel signal converted into a digital signal.

16. The image pickup apparatus according to claim 15, wherein the at least one A/D conversion means outputs the pixel signal converted into the digital signal in the order of the photoelectric conversion means in the horizontal direction.

* * * * *